June 2, 1970 J. L. WALLACE, JR 3,516,072

DATA COLLECTION SYSTEM

Filed Sept. 18, 1967

INVENTOR

Jacob L. Wallace Jr.

BY Tipton D. Jennings

ATTORNEY 3,516,072

DATA COLLECTION SYSTEM

Jacob L. Wallace, Jr., Springfield, Va., assignor to The Susquehanna Corporation, a corporation of Delaware Filed Sept. 18, 1967, Ser. No. 668,616
Int. Cl. G05b *21/00*
U.S. Cl. 340—172.5 10 Claims

ABSTRACT OF THE DISCLOSURE

One form of the invention is shown as a data collection system having a scanning distributor, and a number of encoders. The encoders are sequentially enabled by a shift register and are therefore sequentially scanned by the distributor to generate a data pulse train. A stage of the shift register is associated with each encoder and the shift register is advanced by the distributor. When the shift register is empty, the data collection sequence is terminated.

BACKGROUND OF THE INVENTION

This invention relates to a data collection system and more particularly to such a system for monitoring equipment operation and performance.

In industry it is sometimes preferred to measure the efficiency and amount of work performed by men and machines, as, for example, in the textile loom industry where operating data is needed on the looms in the plant. Loom operation is closely monitored to obtain data which can be helpful in determining efficiency of a machine or manufacturing plant and even matters such as pay of employees where such pay is based on the total time that a particular loom is in operation. Typically, the collected data indicates whether a particular loom is running or stopped; and if it is stopped, the reason why, e.g., warp stoppage, filling stoppage, or any loom stoppage, the latter as may be caused by an actual shutting down of the loom or a malfunction in the loom's mechanical apparatus.

The use of automatic loom monitoring equipment in the electrical noise environment experienced in a textile mill makes automatic monitoring equipment, which is primarily electrical in nature, somewhat susceptible to false signals. This susceptibility is enhanced by the necessity for positioning the encoding equipment at remote stations throughout the mill, and the extensive use of cabling. The result is that erroneous information, in the form of false electrical signals, is received and processed. Some of the noise problems can be corrected by screening, shielding and filtering, but not all. Therefore, if a false signal is injected into the data collecting equipment, the data which is being collected may be unreliable.

SUMMARY

The present invention overcomes the problems of the prior art by the provision of an improved data collection system having a central distributor and a plurality of encoding stations. The encoding stations are arranged in a chain and each contains a stage of a second distributor which can be in the form of a shift register. As the shift register is advanced, the stations in the chain are sequentially enabled and then scanned by the distributor. When all stations have been scanned and the shift register is empty, the data collecting sequence is terminated.

An object of the present invention is to provide an improved data collection system which overcomes the problems of the prior art.

Another object of the present invention is to provide such a system which limits the effect false signals in the system have on the reliability of the collected data.

Other objects and advantages will become obvious from a reading of the specification and claims in conjunction with the accompanying drawings.

DESCRIPTION OF THE PREFERRED EMBODIMENT

Figure 1:
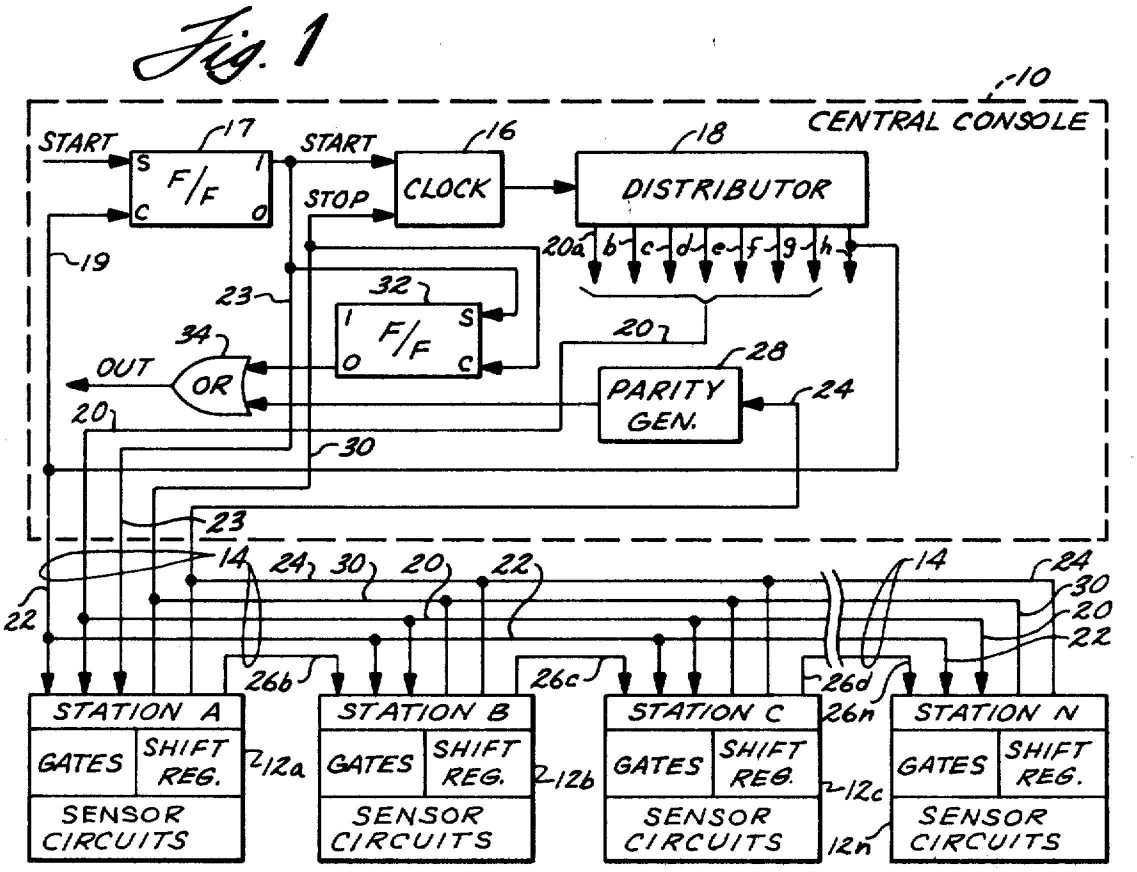
FIG. 1 shows the preferred embodiment of a data collection system having a central scanning distributor and a chain of encoding stations.

In FIG. 1 there is shown a data collection system comprising a central console 10 and a chain of encoding stations 12 connected to the central console by cable 14. The central console 10 controls the data collection sequence in which each of the stations 12 is sampled or scanned in turn.

Within the central console 10 there is a clock 16 having start and stop inputs. The clock 16 is a conventional pulse source such as an oscillator or pulse generator and has its output connected to distributor 18. The start input of clock 16 is connected to the output of a flip-flop 17 which initiates the operation of this clock.

Distributor 18 is a conventional ring counter or shift register which advances internally from stage to stage (not shown) in response to drive pulses from clock 16. As distributor 18 is advanced from stage to stage an output scanning pulse appears sequentially on each of eight output lines 20*a* through 20*h*. The output pulses on lines 20*a* through 20*g* are applied to each of the stations 12 to sample or scan the data stored at these stations. The last output on line 20*h* is connected by line 19 to the Clear side of flip-flop 17.

Output line 20*h* is also connected by line 22 to a second distributor which is formed in each of the stations 12, as later described. The signal on line 22 is used to advance the actuated stage of the second distributor from one station in the chain to the next station upon the completion of each scanning cycle of distributor 18, and thereby each station in the chain is sequentially enabled. Another line 23 is connected from the output of flip-flop 17 to the first station 12*a* in the chain.

Figure 2:
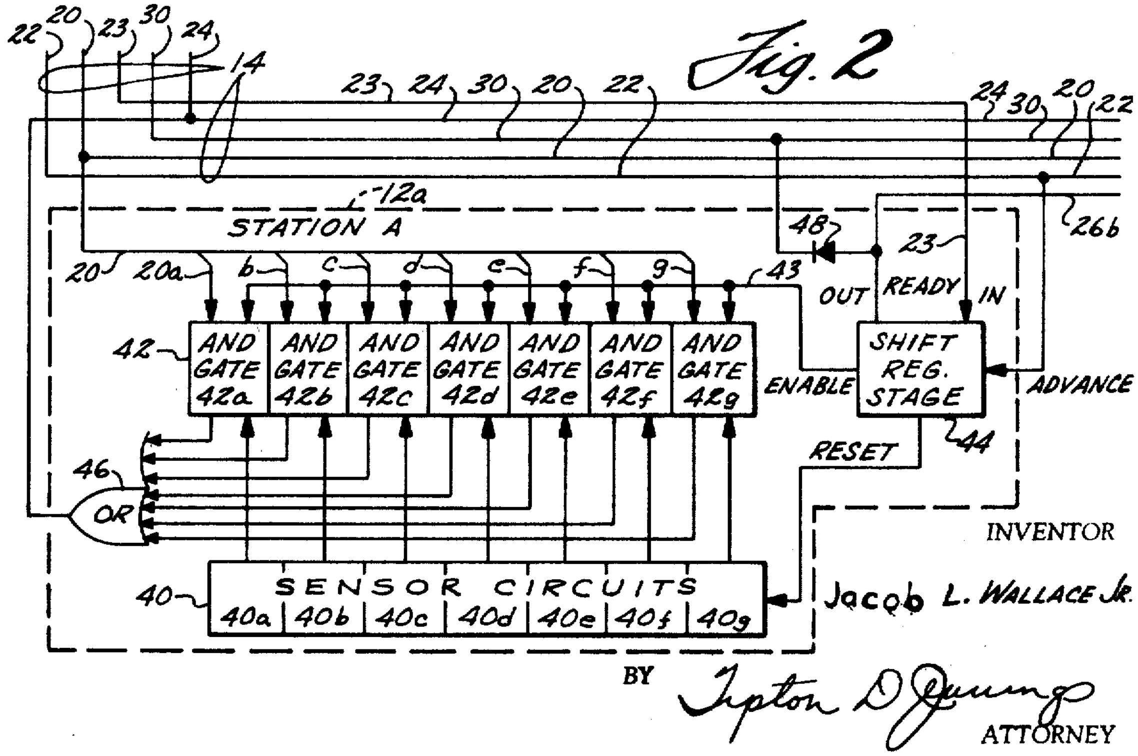
FIG. 2 shows the construction of the stations in the chain.

Each of the encoding stations 12 comprise sensor circuits, at least one stage of the second distributor, and a plurality of gates which are sampled by the distributor 18, as well as additional circuitry which will be more fully described with respect to FIG. 2. In the arrangement shown in FIG. 1, the electrical lines which extend between the stations 12 and the central console 10 are preferably retained in a single cable 14. In addition to the lines described above, this cable contains the line 24 which is connected to each station 12 and carries the output pulse train from each station back to the central console 10. Within the central console 10, line 24 is connected to a conventional parity generator 28 which counts the pulses in the pulse train and adds pulses to the train where necessary.

Cable 14 also contains line 26 which is connected between successive stations 12 in the chain and links the stages of the second distributor. These lines are numbered 26*b*–26*n* and are used to ready these stages in succession so that they are actuated successively by the pulses from line 22. Line 30 is also connected to each encoding station 12 and leads back to the central console to the stop input of clock 16. The signal which appears on this line terminates the scanning cycles of distributor 18 and signifies the completion of a data collection sequence.

The output of flip-flop 17 is also connected to the Set side of another flip-flop 32. Flip-flop 32 keeps the output line of the central console 10 marking except when data collection is in progress. Flip-flop 32 is cleared at the end of the data collection sequence by the signal on line 30 which is connected to its Clear side. Both flip-flop 32 and parity generator 28 are connected to OR gate 34. If the output of either flip-flop 32 or parity generator 28 is a marking condition, the output of OR gate 34 is marking.

The construction of each of the stations 12 in the chain is shown in the block diagram of FIG. 2. Each station is essentially a parallel-to-serial converter in which the status of a group of sensor circuits 40 is sequentially sampled and a serial train of pulses is transmitted which denotes the status of all sensors. The actual scanning occurs at seven AND gates 42 which are each connected to one of the seven lines 20 leading from the distributor 18. The second input to each AND gate 42 is applied by the aforementioned sensors 40. The third input to each AND gate is connected by line 43 to the enable output of the second distributor stage 44, here shown as the stage of a shift register. The output of the AND gates 42 are connected to an OR gate 46 whose output, in turn, is connected to line 24 leading back to central console 10. An output line from stage 44 is connected to the Reset input of each sensor circuit 40, where it is desired to reset these sensor circuits after each scan.

The construction of Station A is selected for FIG. 2 to show how the connections to the shift register stage 44 differ in one respect from the remaining stations 12. Here, the input line 23 from flip-flop 17 (FIG. 1), and not a line 26, is connected to the "Ready" input of stage 44 so that Station A is the first station enabled, and therefore sampled, upon initiation of the data collection sequence. The output line **26*b* from stage 44 leads to the Station B "Ready" input (not shown) so that Station B is the second station scanned in the data collection sequence. With regard to the last encoding station 12 in the chain, Station N, there is a Ready input line 26*n* but the Ready output line 26** is not connected because there are no stations sampled after Station N.

Line 22 is connected to the "Advance" input of the shift register stage 44. The Ready output line from the shift register stage 44 is also connected through a diode 48 to the line 30. The diode 48 at each station forms in combination an OR gate whose output is line 30.

The sensor circuits 40 can provide a variety of information about the machine being monitored. In its simplest form, a sensor (not shown) is positioned at each loom in a loom-monitoring system and merely tells whether that loom is on or off. The output of each sensor is applied to a sensor circuit 40. In such case there are seven looms scanned at Station A, with one sensor circuit 40 responsive to the sensor at each loom. Each sensor circuit can, as an example, be a flip-flop which is Clear when the loom is on and Set when the loom is off. In a more elaborate system all seven sensor circuits 40 can be connected to sensors at one loom and give indication of the cause of the loom stoppage such as warp, mechanical, or filling; information as to which weaver is manning the loom; and information as to which fixer arrived to repair an inoperative machine.

For ease in describing the operation of the present invention, assume that each of the sensor circuits 40 at Station A is connected to a separate loom and that sensor circuits **40*b* 40*c*, and 40*f*** have been Set due to stoppage of the looms at which their associated sensors are positioned. The remaining sensor circuits are Clear.

With reference now to FIGS. 1 and 2, a Start input signal sets flip-flop 17 and begins operation of clock 16 so that a series of drive pulses begins being applied to distributor 18. Flip-flop 32 is Set by flip-flop 17 and the idle marking signal is removed from the output line. This transition to a spacing condition at the output alerts or synchronizes the receiving apparatus, such as a decoder or a computer, so that it is aware that a data collection sequence has begun. Line 23 applies the output of flip-flop 17 to the Ready input of the shift register stage 44 in Station A to condition this stage for receipt of a toggle pulse from distributor 18. At this point, no shift register stage in any station 12 is actuated or loaded and no data sampling can occur at any of these stations. The output line 24 from these stations is in a spacing condition, as is the output of parity generator 28.

The first drive pulse from clock 16 causes the output line **20*a* from distributor 18 to go True. As each successive clock pulse is received, each successive line 20 goes True in turn. However, with no station 12 enabled, the output signal from each station 12 and therefore the central console 10 remains Spacing for the first cycle. When the distributor 18 is advanced by a clock pulse to where output line 20*h* goes True, this True pulse is applied by line 22 to the stations 12. At Station A, the shift register stage 44 is loaded by this True signal. The enable line 43 goes True. Accordingly, the AND gates 42 at Station A only are now in a condition to generate an output if the necessary coincidence occurs when these gates are sampled or scanned by the output of distributor 18**. Normally, the output of each AND gate is a space, while an alarm condition, here defined as loom stoppage, will cause the generation of a marking pulse.

The next drive pulse from clock 16 causes output line **20*a* from distributor 18 to go True. At Station A this True input is applied to AND gate 42*a*. However, sensor circuit 40*a* has not been set, and therefore, the input from this sensor circuit to AND gate 42*a* is False. This AND gate remains closed and its output remains spacing. The next pulse out of clock 16 advances distributor 18 so that output line 20*b* now goes True while output line 20*a* returns to its False state. This True input is applied to AND gate 42*b* at Station A. Sensor circuit 40*b*** is set, and accordingly three True inputs are present at the input to this AND gate. The output of this AND gate goes marking.

When the next output from clock 16 advances distributor 18, output line **20*c* goes true; and this true input is applied to the AND gate 42*c*** at Station A. Three True inputs exist also at this AND gate and its output goes marking.

As distributor 18 continues to be pulsed by clock 16, the remaining output lines 20 go True in turn. In Station A the outputs of AND gates **42*d* and 42*e* remain as spaces; the output of AND gate 42*f* is a mark because of the coincidence of three True inputs; and the output of AND gate 42*g*** is a space.

The output of OR gate 46 which is connected to line 24 is normally in a spacing condition. When a marking input is received from an AND gate 42, the output of this OR gate goes marking. As the outputs of AND gates 42 are sequentially applied to OR gate 46, the output of this OR gate forms a serial train of pulses. For the assumed condition of sensor circuits 40, the sampling of Station A causes an output train having a bit or pulse pattern of space, mark, mark, space, space, mark, space. This pulse train is applied by line 24 to the parity generator 28.

Upon receipt of the next clock pulse, distributor 18 provides a True output on the line **20*h*. As seen by Station A there is no AND gate 42 connected to receive this true input. Accordingly, the output of OR gate 46 is a spacing condition, and the eighth bit position in the pulse train is accordingly a space. In parity generator 28, this eighth bit position is used for generating parity in the pulse train. If "even" marking parity is desired in the train, then with the three mark pulses present in the signal generated by Station A, a marking pulse is added in the eighth bit position of the train by conventional techniques. This pulse train continues through OR gate 34 and out of the central console 10**.

A shift register requires in its operation that each conducting stage ready or condition the next successive stage so that a subsequent advance or toggle pulse will actuate or load this next stage. Therefore, when the shift register stage 44 at Station A was previously loaded by the output of distributor 18 to enable the AND gates 42, a Ready pulse was sent out on line **26*b* after a slight delay to condition the shift register stage located at Station B. After Station A is scanned and line 20h from distributor 18 goes True, this True signal is applied by line 22 to all shift register stages. The shift register stage at Station B becomes actuated, enabling the AND gates in Station B in the same manner as just described with respect to Station A. The sensor circuits in Station B are now ready to be sampled by the distributor 18. The next clock pulse out of clock 16 transfers the True output from line 20h back to line 20a, and the sampling sequence begins again with the result that a pulse train is generated by Station B and applied on line 24 leading back to the central console 10**.

Back at Station A, the True pulse on line 22, which advances the conductive shift register stage to Station B, turns off stage 44. The enable signal is removed from the AND gates 42, making these AND gates nonresponsive to subsequent True pulses received on line 20, until such time as stage 44 is again activated in the next data collection sequence. When stage 44 turns off, a Reset pulse is applied to all sensor circuits. As an example, where flip-flops are used as the sensor circuits 40, the Reset signal is applied to the Clear inputs of these flip-flops, thus making them receptive to subsequent alarm conditions from the monitored looms.

When the sampling of encoding Station B is complete the True signal from line 20h of distributor 18 is carried by line 22 to advance the actuated stage of the second distributor from Station B to the next station, Station C, in the chain so that this latter station becomes enabled. Clock 16 continues to drive distributor 18 and the data at encoding station 12c is now sampled. This sequence of operation continues with each station 12 in the chain being successively sampled by the central distributor 18. When the last station 12 in the chain, here shown as Station N, has been sampled, and the clock 16 advances the distributor 18 to its last stage where output line 20h goes True, the shift register stage at Station N is turned off by this signal via line 22.

When the data collecton sequence began and the shift register stage 44 at Station A was loaded, a signal level was applied to line 30 via the diode 48. Thereafter, there was always a shift register stage conducting at one of the stations 12 during the data collecting sequence and the signal level remained on line 30. When the last shift register stage located at Station N turns off, the shift register is completely unloaded and the signal level on line 30 changes. This change in level stops the clock 16 and no further drive pulses are applied to distributor 18. This level also clears flip-flop 32 and the output of this flip-flop applies a marking condition through OR gate 34 onto the output line which reflects once again the idle condition. The data collection sequence is complete.

Where the data collection system is operating in an environment in which there is a concentration of mechanical equipment, or other potential sources of electrical noise signals, the possibility exists that such a signal can cause the spurious loading of one or more of the stages 44 in the shift register. If such should occur, the advancing of a pulse out of the shift register would leave one or more stages still loaded if the system were so designed that the first pulse out terminated the data collection sequence. Not only would the immediate collected data be unreliable, but subsequent data collection sequences would also produce unreliable data because more than one stage of the shift register would be conductive during each scan of distributor 18, and more than one station 12 would generate an output.

The present invention makes the termination of the data collecting sequence responsive to an empty shift register. Thus, even if a false signal causes more than the one shift register stage to be loaded, the shift register will be continuously advanced after each distributor cycle until it is completely unloaded or empty, and the system will be in a normal condition to undertake a subsequent data collection sequence. Only one sequence of data is unreliable.

The data collection system may be arranged with the stations 12 in the chain strung out from the central console 10; however, even with this arrangement, it may be desirous to have one or more encoding stations formed as part of this console. For example, the first station 12 might monitor a digital clock so that the time of day forms the first part of the pulse train generated during a data collection sequence. Additional stations can contain a fixed code which alerts the decoder or computer that a data collection sequence has begun. Likewise, the last station 12, Station N, can be looped back into the console 10 and used by an operator at the console to insert information manually by the use of thumb wheels or the like. These sensor circuits are then sampled during the data collection sequence to form part of the information present in the pulse train being transmitted to a decoder or computer.

The distributor 18 can contain additional output lines 20, if desired, whose outputs would correspond to start and stop pulses. These additional lines would be connected into parity generator 28 or into OR gate 34 so that the start and stop pulses would be injected into the output pulse train. Flip-flop 32 would be eliminated in this modification. The start input for flip-flop 17 can be responsive to manual means, a timing circuit, or other conditions, as selected.

It will be apparent that various modifications may be made herein within the spirit and scope of the invention and it is desired, therefore, that only such limitations be placed upon the invention as are imposed by the prior art and set forth in the appended claims.

What is claimed is:

1. A data collection system comprising a central distributor said central distributor having a plurality of sampling outputs, a chain of encoding stations, means for connecting each encoding station to the plurality of sampling outputs so that said central distributor samples the data at each encoding station, a second distributor having a plurality of stages with one stage at each encoding station, means for serially connecting said stages in said system, means responsive to said central distributor for actuating successively said stages from the first to the last station to sequentially enable each station for sampling by said central distributor, and means responsive to the stage of the second distributor associated with each station in the chain for terminating the output of said central distributor to signify the completion of a data collection sequence.

2. A data collection system as claimed in claim 1 wherein said second distributor is formed as a shift register, and said serially connecting means is connected to condition the next successive stage following an actuated stage for actuation by said actuating means following sampling of said actuated stage.

3. A data collection system as claimed in claim 2 wherein said terminating means is connected to the shift register stage at each station and is responsive to the absence of an actuated stage at all encoding stations for terminating the output of said central distributor.

4. A data collection system as claimed in claim 2 further comprising clock means, said clock means applying its output to drive said central distributor, means for initiating the application of the clock output to said distributor, and means responsive to the initiation of the application of the clock output for conditioning the stage of said shift register at the first station in the chain for actuation by said actuating means.

5. A data collection system as claimed in claim 4 wherein said terminating means is connected to terminate the output of said clock and thereby terminate the output of said central distributor.

6. A data collection system as claimed in claim 2 further comprising a common output for all encoding stations in the chain and means for connecting the output of each station to said common output, the output signal from said common output during the data collection sequence being a pulse train whose pulses are indicative of the data sampled by the central distributor at each encoding station.

7. A data collection system as claimed in claim 1 wherein each encoding station includes a plurality of gates, each of said gates being connected to one of said sampling outputs, and means connected from each gate to the second distributor stage for enabling said gates when said stage is actuated.

8. A data collection system as claimed in claim 7 wherein said terminating means is connected to the second distributor stage at each encoding station and is responsive to the absence of an actuated stage at all encoding stations for terminating the output of said central distributor.

9. A data collection system as claimed in claim 8 further comprising clock means, said clock means applying its output to drive said central distributor, means for initiating the application of the clock output to said distributor, and means responsive to the initiation of the application of the clock output for conditioning the stage of said second distributor at the first station in the chain for actuation by said actuating means.

10. A data collection system as claimed in claim 5 wherein said terminating means is connected to the shift register stage at each station and is responsive to the absence of an actuated stage at all encoding stations for terminating the output of said central distributor.

References Cited

UNITED STATES PATENTS

| | | | |
|---|---|---|---|
| 3,200,194 | 8/1965 | Rabinow | 178—6 |
| 3,381,275 | 4/1968 | Israely | 340—172.5 |

PAUL J. HENON, Primary Examiner

R. F. CHAPURAN, Assistant Examiner